(12) United States Patent
Clapper

(10) Patent No.: US 6,972,944 B2
(45) Date of Patent: Dec. 6, 2005

(54) SLIDING SCREEN EMERGING KEYBOARD

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 10/437,757

(22) Filed: May 13, 2003

(65) Prior Publication Data
US 2004/0228076 A1  Nov. 18, 2004

(51) Int. Cl.[7] .................................. H05K 5/00
(52) U.S. Cl. ......................... 361/679; 361/683
(58) Field of Search ..................... 361/679–681, 361/683, 686

(56) References Cited

U.S. PATENT DOCUMENTS

| | | | |
|---|---|---|---|
| 4,735,466 A | 4/1988 | Wolters et al. | |
| 5,812,116 A | 9/1998 | Malhi | |
| 6,816,363 B2 * | 11/2004 | Yamamoto | ............... 361/681 |
| 2001/0048589 A1 | 12/2001 | Brandenberg et al. | |
| 2003/0030971 A1 | 2/2003 | Duarte | |

FOREIGN PATENT DOCUMENTS

| | | |
|---|---|---|
| WO | WO 01/84728 | 11/2001 |
| WO | PCT/US2004/008953 | 11/2004 |

* cited by examiner

*Primary Examiner*—Yean-Hsi Chang
(74) *Attorney, Agent, or Firm*—Blakely, Sokoloff, Taylor & Zafman LLP

(57) ABSTRACT

A mobile computing apparatus that includes a sliding screen and a keyboard that moves from a storage position to a typing position in response to the screen being moved from a closed position to an open position.

15 Claims, 3 Drawing Sheets

SLIDING SCREEN EMERGING KEYBOARD

FIELD OF THE INVENTION

Embodiments of the present invention relate to a sliding screen emerging keyboard for mobile computing devices.

BACKGROUND

Mobile computing devices are becoming ever more popular today. Users of the mobile computing devices are no longer simply using the mobile computing devices to read and update calendars and address books, but rather they are being used in more comprehensive computing ways. For example, users of the mobile computing devices are typically entering substantially more data into the mobile computing devices, typically by typing data into the mobile computing device.

Typing data into a mobile device has typically not been a very user-friendly experience due in part to the small form factors of the mobile computing devices. For example, current solutions are on-screen keyboards, cable attached solutions, cryptic entry methods, and voice text input. Each of the solutions has been demonstrated to be inferior to an ordinary keyboard, with the exception of the cable attached keyboard, which limit mobility when attached.

More specifically, the on-screen keyboards and other related types of keyboards typically include very small keystrokes, which make it difficult for the user to type. Other mobile computing devices may have integrated keyboards that slide out away from the computing device, but the keyboards are in a fixed position, which limits the ergonomics of the keyboard.

DETAILED DESCRIPTION

Embodiments of a sliding screen emerging keyboard for a mobile computer, are disclosed. In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
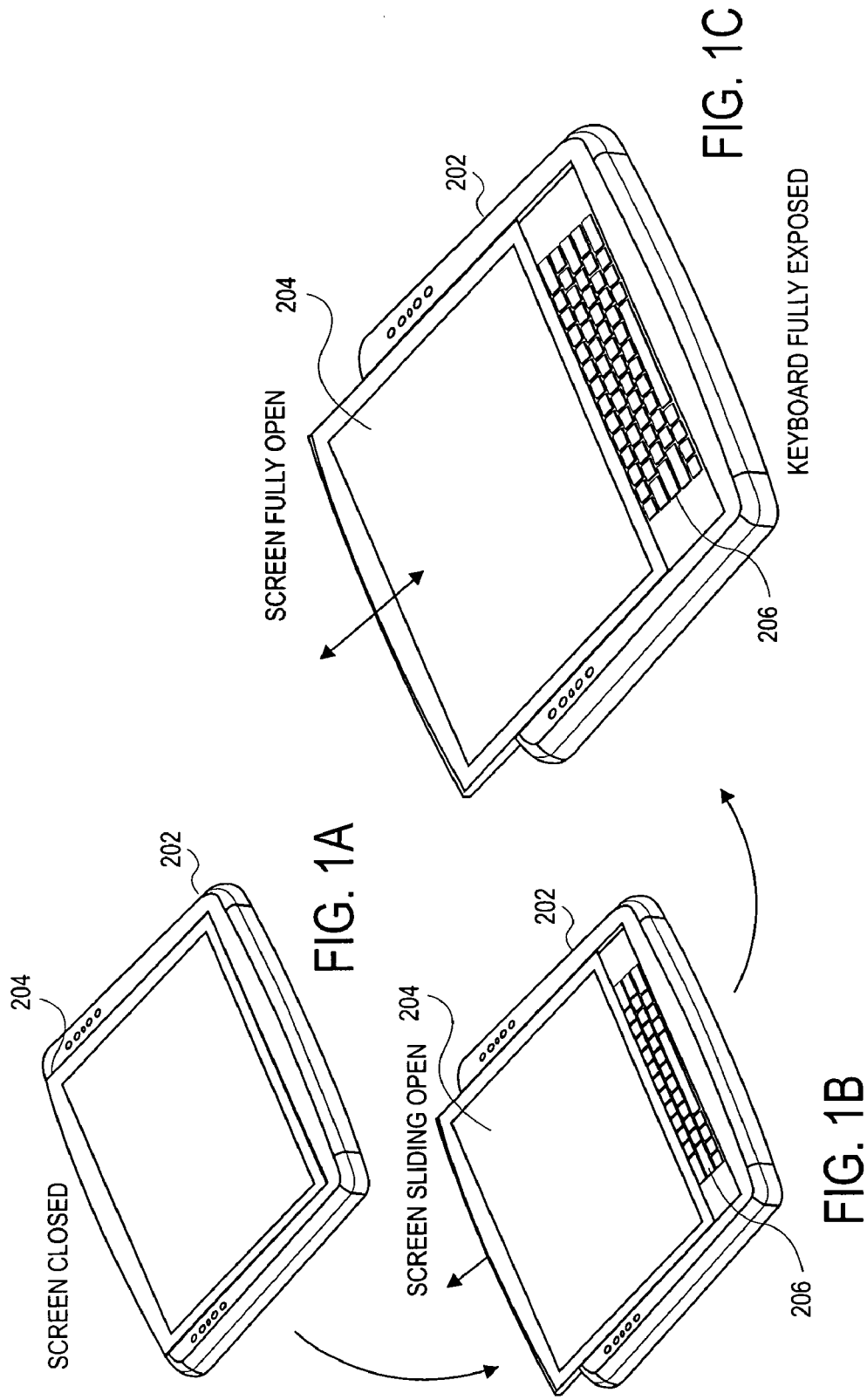
FIGS. 1a–c are a perspective illustration of a mobile computer having a sliding screen and an emerging keyboard, according to one embodiment.

In one embodiment, as illustrated in FIGS. 1a–c, a portable or mobile computer apparatus 202 (such as a notebook computer, tablet personal computer, laptop computer, personal digital assitant (PDA), etc.) includes a screen 204 which is integrated with the computer 202. The screen 204, in a first closed position, illustrated in FIG. 1a, covers a keyboard 206 (not shown in FIG. 1a), which is also integrated with the computer 202. The screen 204 may be slid open from the first position, as illustrated in FIG. 1b, to a second position of being fully open, as illustrated in FIG. 1c. When the screen 204 is slid open to the second position of being open, the keyboard 206 is also exposed.

In addition, in one embodiment, when the screen 204 of the mobile computer 202 is slid to the second position of being open, the exposed keyboard 206 moves from a first position to a second position. More specifically, in response to the screen 204 of the mobile computer 202 being slid to the second position of being open, the keyboard 206 emerges from a first position of being in storage to a second position to be used for typing and entry of data into the mobile computer 202.

Figure 2:
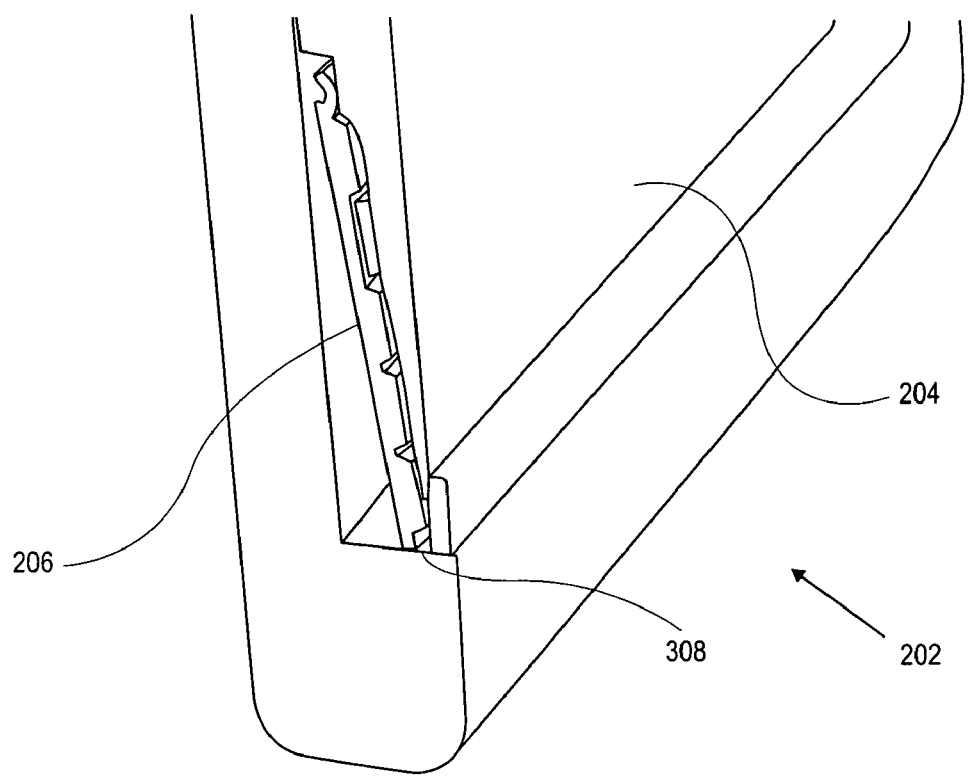
FIG. 2 is a cut-away illustration of a keyboard tucked away in a storage position under the sliding screen, according to one embodiment.
Figure 3A:
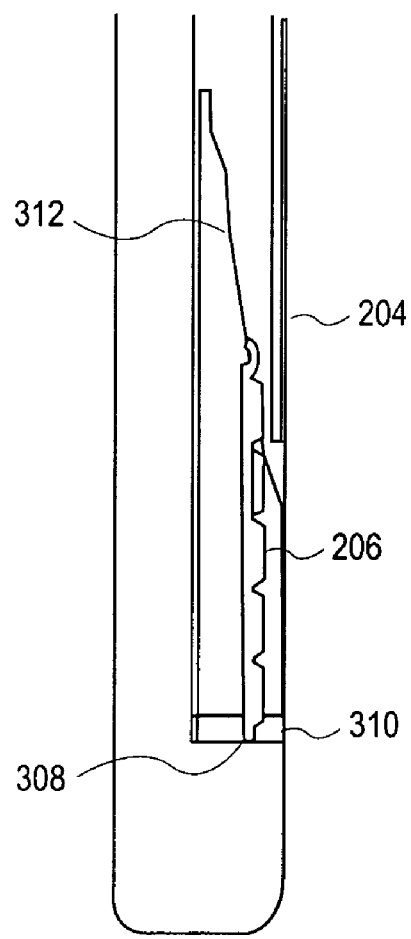
FIGS. 3a–b are an illustration of the emerging keyboard moving from a stored position to a typing position, according to one embodiment.

In particular, as one embodiment is illustrated in FIG. 2, when the screen 204 is closed, the keyboard 206 is in a tucked away position, underneath the closed screen 204. As the screen 204 is slid open, as illustrated in FIG. 3a, a spring loaded binge 308, which in one embodiment is located at an end 310 of the keyboard 206 that is opposite of the sliding screen 204, pushes the keyboard 206 upward to a typing position. As is further illustrated in FIG. 3a, a cam surface 312 on the back of the sliding screen 204 helps to guide the keyboard 206 from a storage position to the typing position. In alternative embodiments, a set of tracks may be used in place of the cam surface 312 to guide the keyboard 206 into a typing position.

Figure 3B:
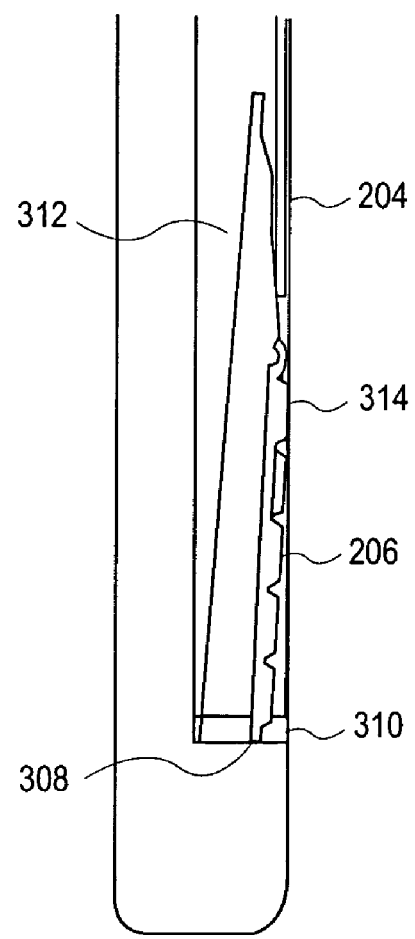

When the screen is slid to an open position, as illustrated in FIG. 3b, the keyboard 206 is positioned in a typing position. In alternative embodiments, the screen 204 may be slid to a less than a fully opened position for the keyboard 206 to be moved to a typing position. Furthermore, in one embodiment, as illustrated in FIG. 3b, the typing position of the keyboard 206 may include a slight angle to place the keyboard in a more ergonomic position for typing. In particular, an end 314 of the keyboard closest to the sliding screen 204 may be higher than an end 310 opposite the sliding screen to provide the angle of the keyboard 206 when in the typing position.

In one embodiment, when the keyboard 206 is in a typing position, position locks may be used to secure the keyboard 206 in the typing position. The position locks may be deactuated by the sliding action of the screen. Furthermore, in one embodiment, the physical location of the keyboard 206 may be used in conjunction with a sensor to tell the mobile computer whether to turn the keyboard 206 on or off. For example, when the keyboard is in a typing position, the sensor may indicate to the computer that the keyboard is on and data typed via the keyboard will be received and processed by the computer. In one embodiment, the sensors may include the alignment of a contact on the keyboard and a contact on the computer, which are aligned when the keyboard is in a typing position, and are unaligned when the keyboard is not in typing position.

When the keyboard 206 is no longer required, the user simply slides the screen 204 back to the closed position, causing the cam 312 to guide the keyboard 206 downward to a storage position tucked away under the sliding screen 204.

These embodiments have been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A mobile computing apparatus, comprising:
   a sliding screen;
   a keyboard to move from a storage position to a typing position in response to the screen being moved from a first position to a second position;
   a spring loaded hinge to push the keyboard upward to the typing position; and
   a cam surface to direct the keyboard into the typing position, and to direct the keyboard downward into the storage position tucked away under the sliding screen.

2. The apparatus of claim 1, wherein the first position of the screen is closed covering the keyboard, and the second position of the screen is open uncovering the keyboard.

3. The apparatus of claim 1, wherein the keyboard is integrated with the mobile computing apparatus.

4. The apparatus of claim 3, wherein the spring loaded hinge biases the keyboard to be pushed into the typing position in response to the screen being moved from the first position to the second position.

5. The apparatus of claim 3, further including position locks to secure the keyboard in a typing position.

6. The apparatus of claim 3, further including a sensor to have the keyboard powered on when in the typing position and powered off when in the storage position.

7. A mobile computing apparatus, comprising:
   a screen moveable from a closed position to an open position;
   an emerging keyboard to emerge from a first position to a second position in response to the screen being moved from the closed position to the open position;
   a spring loaded hinge to push the keyboard upward to the typing position; and
   a cam surface to direct the keyboard into the typing position, and to direct the keyboard downward into the storage position tucked away under the sliding screen.

8. The apparatus of claim 7, wherein the first position of the keyboard is a storage position with the screen in the closed position, and the second position of the keyboard is a typing position with the screen in the open position.

9. The apparatus of claim 6, wherein the keyboard is integrated with the mobile computing apparatus.

10. The apparatus of claim 8, wherein the spring loaded hinge biases the keyboard to be pushed into the typing position in response to the screen being moved from the closed position to the open position.

11. The apparatus of claim 8, further including position locks to secure the keyboard in a typing position.

12. The apparatus of claim 8, further including a sensor to have the keyboard powered on when in the typing position and powered off when in the storage position.

13. A mobile computing apparatus, comprising:
   a sliding screen;
   a keyboard integrated with the computing apparatus, the keyboard to move from a storage position to a typing position in response to the screen being moved from a closed position covering the keyboard to an open position uncovering the keyboard, the keyboard being pushed upward by a spring loaded hinge into the typing position in response to the screen being moved from the closed to the open position; and
   one or more cam surfaces to direct the keyboard upward into the typing position, and to direct the keyboard downward into the storage position tucked away under the sliding screen.

14. The apparatus of claim 13, further including position locks to secure the keyboard in a typing position.

15. The apparatus of claim 13, further including a sensor to have the keyboard powered on when in the typing position and powered off when in the storage position.

* * * * *